(12) United States Patent
Shinoda et al.

(10) Patent No.: US 8,018,675 B2
(45) Date of Patent: Sep. 13, 2011

(54) THIN FILM MAGNETIC HEAD

(75) Inventors: Minoru Shinoda, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 752 days.

(21) Appl. No.: 12/043,704

(22) Filed: Mar. 6, 2008

(65) Prior Publication Data

US 2009/0226761 A1   Sep. 10, 2009

(51) Int. Cl.
*G11B 5/31* (2006.01)
(52) U.S. Cl. .................................... 360/125.01
(58) Field of Classification Search ............... None
See application file for complete search history.

(56) References Cited

U.S. PATENT DOCUMENTS

| 7,046,480 B2* | 5/2006 | Sasaki et al. ............ 360/125.5 |
| 7,527,988 B2* | 5/2009 | Lee et al. ............ 438/20 |
| 2006/0284181 A1* | 12/2006 | Chae et al. ............ 257/66 |
| 2008/0008760 A1* | 1/2008 | Bianco et al. ............ 424/489 |
| 2009/0121196 A1* | 5/2009 | El Bounia ............ 252/511 |
| 2010/0014187 A1* | 1/2010 | Winarski ............ 360/75 |

FOREIGN PATENT DOCUMENTS

| JP | A 10-64013 | 3/1998 |
| JP | A 11-31307 | 2/1999 |
| JP | A 2001-110015 | 4/2001 |

* cited by examiner

*Primary Examiner* — Mark Blouin
(74) *Attorney, Agent, or Firm* — Oliff & Berridge, PLC

(57) ABSTRACT

The thin-film magnetic head in accordance with the present invention comprises a magnetic pole, a coil surrounding the magnetic pole, and an insulating layer covering the coil, while the insulating layer is formed from a resin containing a carbon nanotube. Preferably, the resin contains 0.05 to 5 wt % of the carbon nanotube. Preferably, the resin contains a cyclodextrin.

11 Claims, 4 Drawing Sheets

THIN FILM MAGNETIC HEAD

BACKGROUND OF THE INVENTION

1. Field of the Invention

The present invention relates to a thin-film magnetic head, a head gimbal assembly, and a hard disk drive.

2. Related Background Art

As hard disk drives have been achieving higher recording densities, further improvements in thin-film magnetic heads have been in demand. Composite thin-film magnetic heads having a structure in which a magnetism detecting element such as magnetoresistive (MR) element and a magnetic recording element such as electromagnetic coil element are laminated have been in wide use as a thin-film magnetic head, while these elements read/write data signals from/onto magnetic recording media.

The electromagnetic coil element comprises a coil which generates a magnetic field in response to a current applied thereto and a magnetic pole which forms a path for the magnetic field and releases the magnetic field from a desirable place in a medium-opposing surface. The coil is typically covered with an insulating resin layer (see, for example, Japanese Patent Application Laid-Open Nos. 10-64013 and 11-31307).

When a current flows through a coil at the time of a writing action, the coil is heated by the Joule heat. When the temperature rises in the coil and its surroundings because of the heating of the coil, adverse effects such as generation of thermal stresses and deterioration in performances of the magnetism detecting element occur as described in Japanese Patent Application Laid-Open No. 2001-110015. Therefore, it is necessary to fully dissipate the heat generated from the coil.

SUMMARY OF THE INVENTION

However, it has been difficult for conventional thin-film magnetic heads to sufficiently transfer the heat generated from the coil to its surroundings and fully dissipate the heat therefrom. When the heat generated from the coil is not dissipated sufficiently, the thin-film magnetic heads may thermally expand, thereby projecting on the medium-opposing surface side. Such expansion is unfavorable, since the distance between the medium-opposing surface and the medium is required to be adjusted to a very small length.

In view of such a problem, it is an object of the present invention to provide a thin-film magnetic head which is easier to dissipate the heat generated from a coil for writing than the conventional ones, a head gimbal assembly using the same, and a hard disk drive using the same.

The thin-film magnetic head in accordance with the present invention comprises a magnetic pole, a coil surrounding the magnetic pole, and an insulating layer covering the coil, while the insulating layer is formed from a resin containing a carbon nanotube.

In the present invention, the thermal conductivity of the resin in the resin layer becomes much higher than that conventionally attainable, since it contains a carbon nanotube. Therefore, the heat generated from the coil can efficiently be conducted to its surroundings, whereby a thin-film magnetic head which is excellent in heat dissipation is realized.

Preferably, the resin contains 0.05 to 5 wt % of the carbon nanotube.

Containing the carbon nanotube by such a concentration achieves an excellent thermal conductivity and makes it easy to keep sufficient electric insulation.

Preferably, the resin further contains a cyclodextrin.

This can favorably disperse the carbon nanotube into the resin and thus is particularly easy to keep sufficient electric insulation.

Preferably, the resin is a chemically amplified photoresist.

The head gimbal assembly in accordance with the present invention comprises a substrate, the thin-film magnetic head formed on the substrate, and a gimbal securing the substrate.

The hard disk drive in accordance with the present invention comprises the head gimbal assembly and a recording medium opposing the thin-film magnetic head.

The present invention can provide a thin-film magnetic head which is easier to dissipate the heat generated from a coil for writing than the conventional ones, a head gimbal assembly using the same, and a hard disk drive using the same.

DESCRIPTION OF THE PREFERRED EMBODIMENTS

Figure 1:
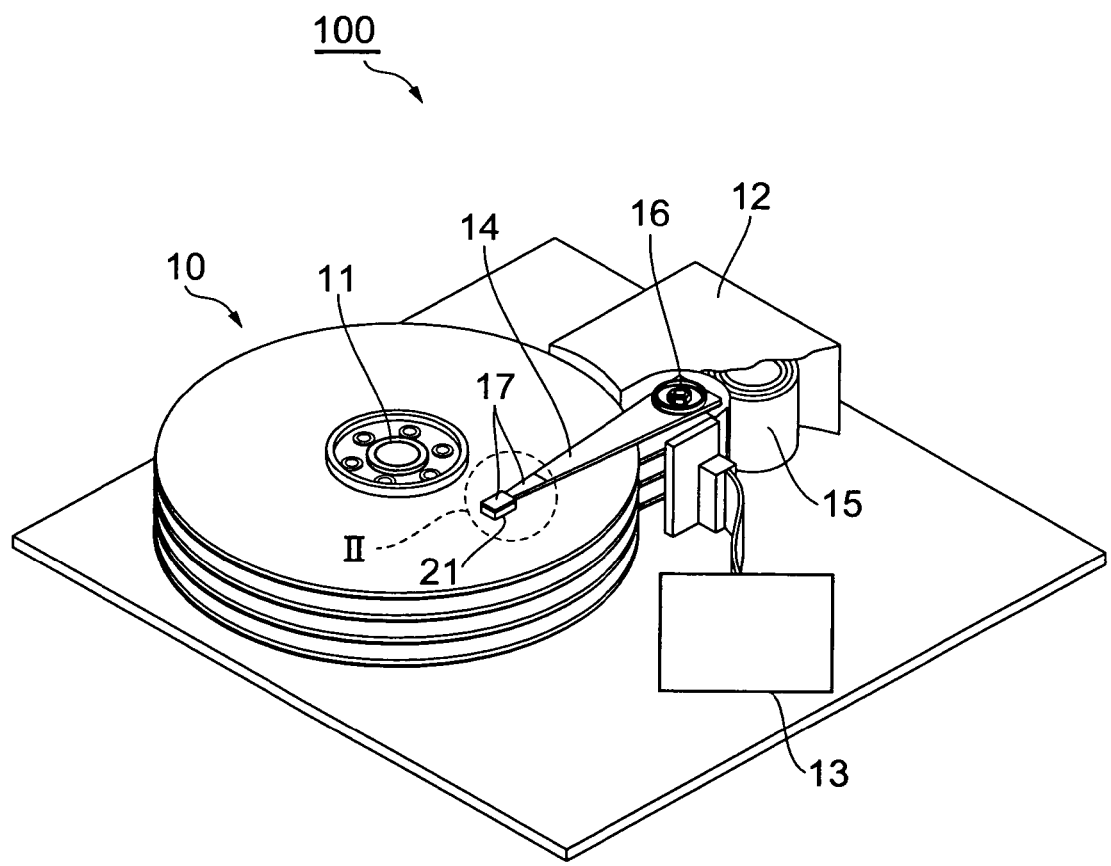
FIG. 1 is a perspective view of the hard disk drive in accordance with an embodiment.

In the following, modes for carrying out the present invention will be explained in detail with reference to the accompanying drawings. The same constituents are referred to with the same reference numbers in the drawings. Dimensional ratios in and among the constituents in the drawings are arbitrary for the convenience of viewing the drawings.

Hard Disk Drive

FIG. 1 is a perspective view of the hard disk drive in accordance with an embodiment. The hard disk drive 1 comprises magnetic disks 10 which are a plurality of magnetic recording media rotating about a rotary axis of a spindle motor 11, an assembly carriage apparatus 12 for positioning sliders 21 on tracks, and a read/write control circuit 13 for controlling writing and reading actions of the sliders 21.

The assembly carriage apparatus 12 is provided with a plurality of driving arms 14. These driving arms 14 can be swung by a voice coil motor (VCM) 15 about a pivot bearing shaft 16, and are stacked in a direction along the shaft 16. A head gimbal assembly (HGA) 17 is attached to the leading end part of each driving arm 14. Each HGA 17 is provided with a slider 21 opposing the front face of its corresponding magnetic disk 10. The surface opposing the front face of the magnetic disk 10 is a medium-opposing surface S (also known as air bearing surface) of the slider 21. The magnetic disk 10, driving arm 14, HGA 17, and slider 21 may be provided one by one as well.

HGA

Figure 2:
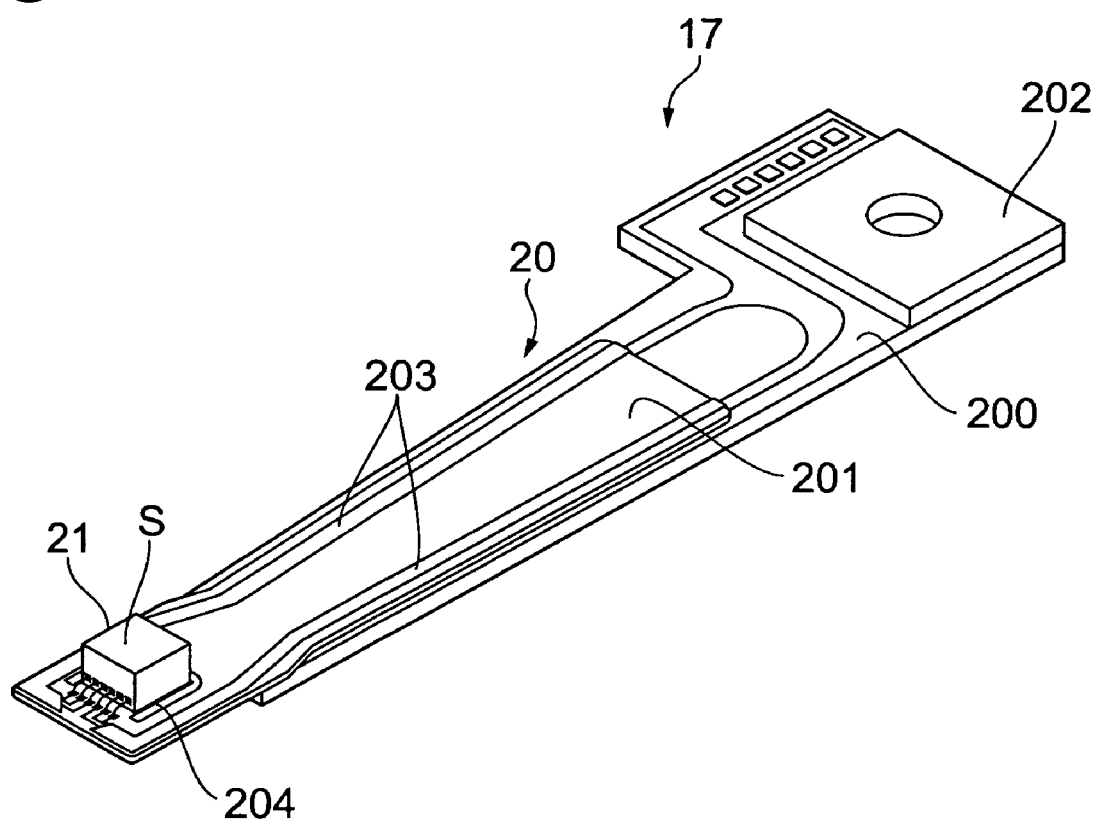
FIG. 2 is an enlarged perspective view of the head gimbal assembly (HGA) in FIG. 1.

FIG. 2 is a perspective view of the HGA 17. This drawing is illustrated with the medium-opposing surface S of the HGA 17 facing up.

The HGA 17 is constructed by firmly attaching the slider 21 to the leading end part of a suspension 20 and electrically connecting respective one ends of wiring members 203 to terminal electrodes of the slider 21. The suspension 20 is mainly constituted by a load beam 200, an elastic flexure 201 firmly attached onto and supported by the load beam 200, a tongue 204 formed like a leaf spring at the leading end of the flexure 201, a base plate 202 provided at the base part of the load beam 200, and the wiring members 203, each composed of a lead conductor and connection pads electrically connected to both ends thereof, which are provided on the flexure 201.

The suspension structure in the HGA 17 is not limited to the one mentioned above as a matter of course. Though not depicted, a head driving IC chip may be mounted somewhere in the suspension 20.

Figure 3:
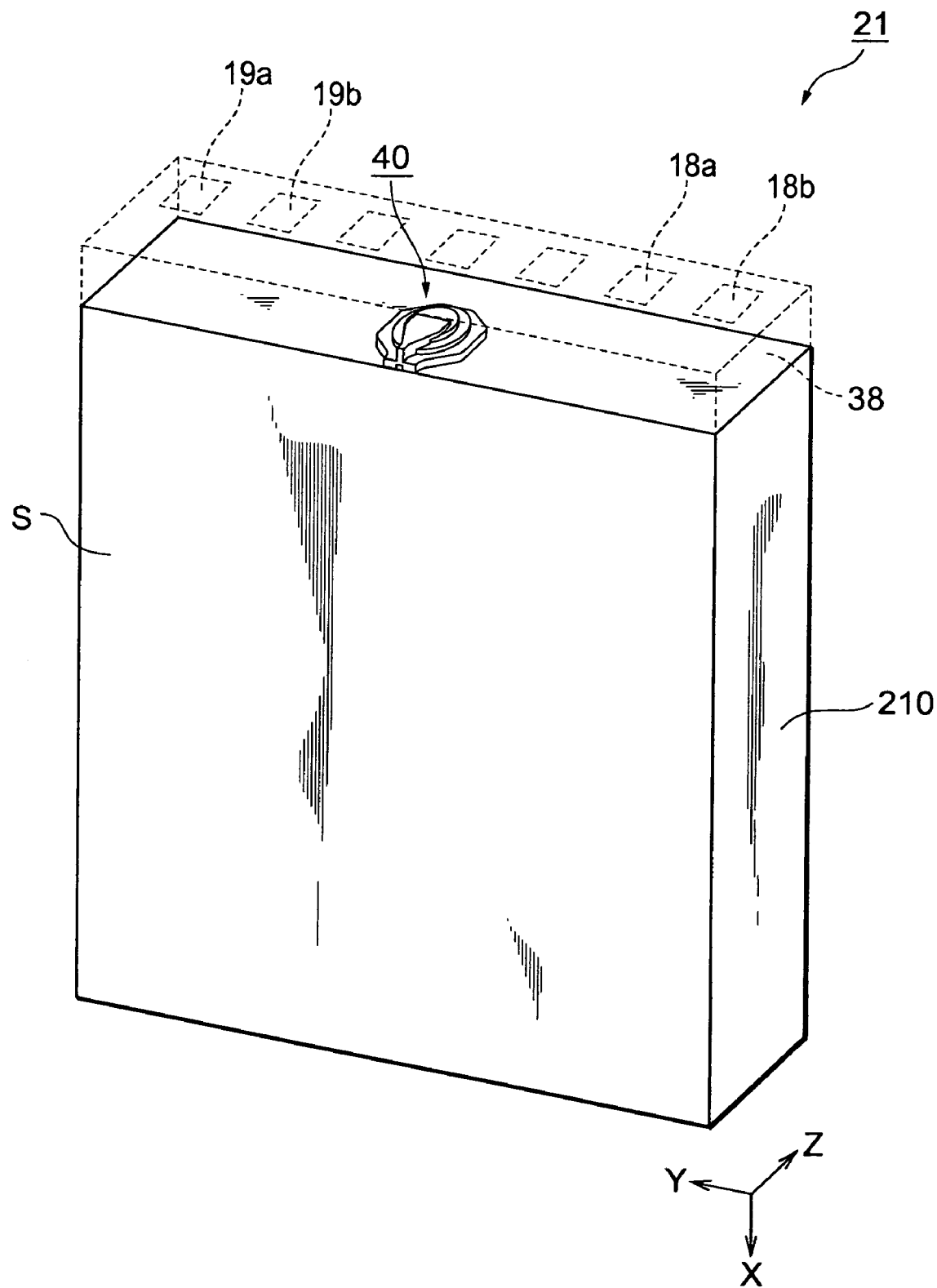
FIG. 3 is an enlarged perspective view of the slider in FIG. 2.

FIG. 3 is an enlarged perspective view of the slider 21 in accordance with this embodiment. The slider 21 is one in which a thin-film magnetic head 40 is formed on a side face of a slider substrate 210 mainly composed of AlTiC ($Al_2O_3 \cdot TiC$), and the slider 21 has a substantially rectangular parallelepiped form. The surface on the front side in this drawing is the medium-opposing surface S opposing the recording surface of the magnetic recording medium 10 (see FIG. 1). When the magnetic recording medium 10 rotates, an airflow accompanying the rotation levitates the slider 21 and separates the medium-opposing surface S from the recording surface of the magnetic recording medium 10. If necessary, bumps and dips may be formed on the medium-opposing surface of the slider 21 so as to control the floating height. The slider 21 is provided with an insulating layer 38 as an overcoat layer indicated by broken lines in the drawing. Recording pads 18a, 18b, reproducing pads 19a, 19b, and the like are attached onto the insulating layer 38. The medium-opposing surface S may be coated with DLC (Diamond Like Carbon) and the like.

Slider

Figure 4:
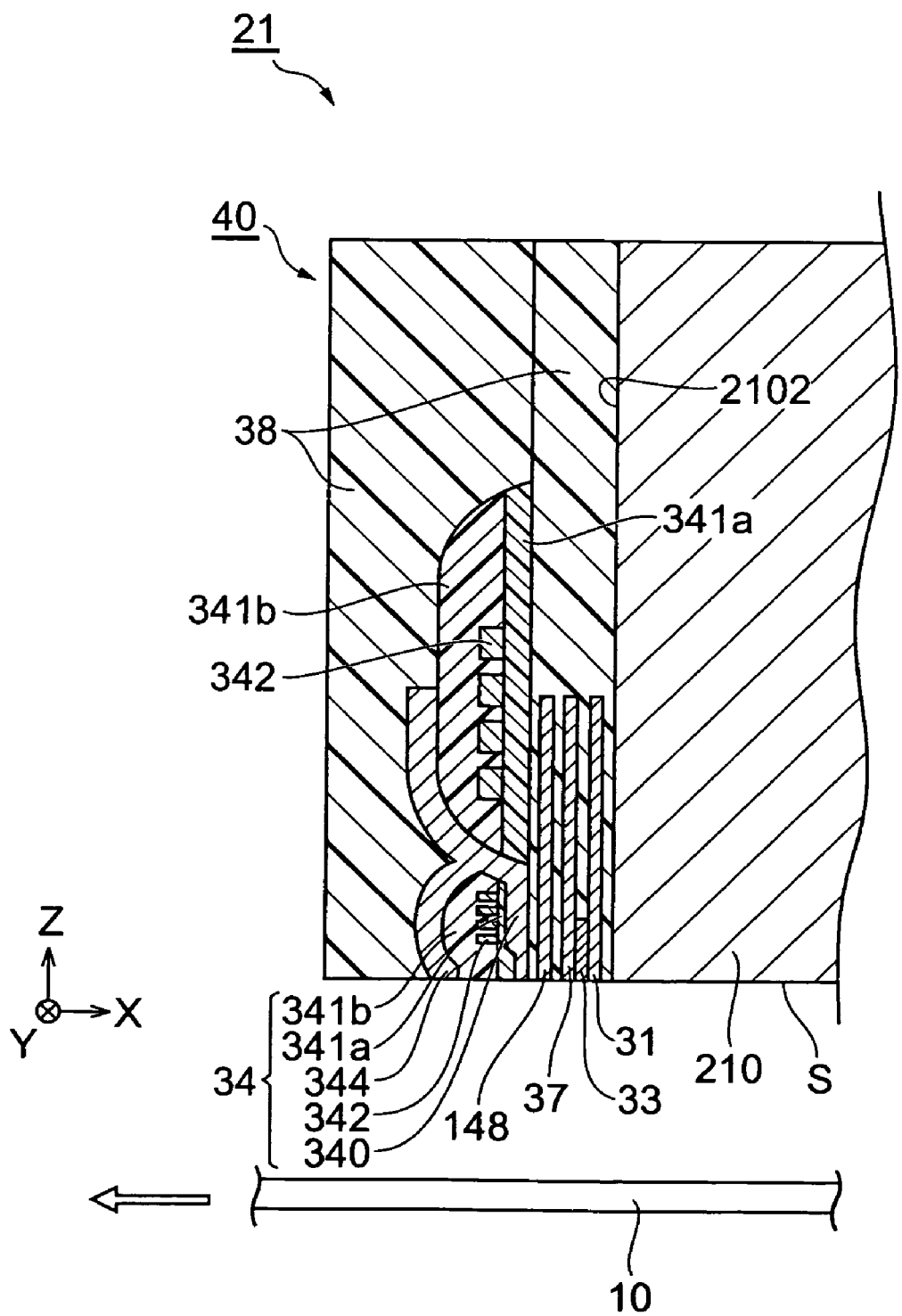
FIG. 4 is a sectional view of the slider in FIG. 2 taken parallel to the XZ plane.

FIG. 4 is a sectional view of the slider 21 shown in FIG. 1, which is taken along a direction perpendicular to the medium-opposing surface S, i.e., a direction parallel to the XZ plane, schematically showing how it opposes the magnetic recording medium 10.

As shown in FIG. 4, the slider 21 comprises the slider substrate 210 and the thin-film magnetic head 40 laminated on a lamination surface 2102 of the slider substrate 210.

Thin-Film Magnetic Head

The thin-film magnetic head 40 has a magnetoresistive element 33 as a magnetism detecting element arranged between a lower magnetic shield layer 31 and an upper magnetic shield layer 37 and an electromagnetic coil element 34 as a magnetic recording element.

The lower magnetic and upper magnetic shield layer 31, 37 are planar layers extending in the height direction (perpendicular to the medium-opposing surface S, i.e., along the Z axis of FIG. 2) from the medium-opposing surface S so as to be substantially parallel to the lamination surface 2102 of the slider substrate 210. The lower magnetic shield layer 31 is located closer to the slider substrate 210 than is the upper magnetic shield layer 37. The lower and upper magnetic shield layers 31, 37 form a part of the medium-opposing surface S. The magnetoresistive element 33 is arranged such as to be held between the lower and upper magnetic shield layers 31, 37 and extend in the height direction from the medium-opposing surface S.

Each of the lower and upper magnetic shield layers 31, 37 can be constituted by a magnetic material such as NiFe, CoFeNi, CoFe, FeN, or FeZrN having a thickness on the order of 0.5 to 3 µm formed by pattern plating such as frame plating, for example. The lower and upper magnetic shield layers 31, 37 prevent the magnetoresistive element 33 from being affected by external magnetic fields which become noise.

The magnetoresistive element 33 is a multilayer film of current-perpendicular-to-plane (CPP) type in which a sense current flows in a direction (along the X axis of FIG. 4) perpendicular to its lamination surface, for example, while a tunneling magnetoresistive (TMR) element or CPP type GMR (giant magnetoresistive) element can favorably be used therefor. When a CPP type multilayer film is used as the magnetoresistive element 33, the upper and lower magnetic shield layers 37, 31 also function as upper and lower electrode layers for supplying a sense current to the magnetoresistive element 33. Namely, the upper and lower magnetic shield layers 37, 31 are electrically connected to the reproducing pads 19a, 19b (see FIG. 3), respectively. When a voltage is applied between the reproducing pads 19a, 19b, the sense current is supplied to the magnetoresistive element 33.

As shown in FIG. 4, an interelement magnetic shield layer 148 made of the same material as that of the upper magnetic shield layer 37 is formed between the upper magnetic shield layer 37 and electromagnetic coil element 34. The interelement magnetic shield layer 148 acts to block the magnetoresistive element 33 from magnetic fields generated from the electromagnetic coil element 34, thereby preventing exogenous noise from occurring at the time of reading.

An insulating layer 38 made of alumina or the like is formed between the upper and lower magnetic shield layers 37, 31 on the side opposite from the medium-opposing surface S of the magnetoresistive element 33, on the side opposite from the medium-opposing surface S of the upper and lower magnetic shield layers 37, 31 and interelement shield layer 148, between the lower shield layer 31 and slider substrate 210, between the upper magnetic shield layer 37 and interelement shield layer 148, and between the interelement magnetic shield layer 148 and electromagnetic coil element 34.

A multilayer film of current-in-plane (CIP) type can also be used as the magnetoresistive element 33. In this case, the insulating layer 38 is also provided between the magnetoresistive element 33 and each of the upper and lower magnetic shield layers 37, 31. In this case, though not depicted, an MR lead conductor layer for supplying the sense current to the magnetoresistive element 33 and taking out a reproduced output therefrom is formed.

Electromagnetic Coil Element

The electromagnetic coil element 34 is preferably one for perpendicular magnetic recording. As shown in FIG. 4, it comprises a main magnetic pole layer 340, a gap layer 341a, a coil 342, a coil insulating layer (insulating layer) 341b, and an auxiliary magnetic pole layer 344.

The main magnetic pole layer 340 is a magnetic path by which a magnetic flux induced by the coil 342 is guided to the recording layer of the magnetic recording medium 10 to be written while being converged. Preferably, the width in the track width direction (along the Y axis in FIG. 2) and thickness in the laminating direction (along the X axis in FIG. 2) of the end part on the medium-opposing surface S side of the main magnetic pole layer 340 are made smaller than those in the other part. This makes it possible to generate a fine, strong writing magnetic field suitable for higher recording densities.

The auxiliary magnetic pole layer 344 is a magnetic path for guiding the magnetic flux returning from the recording layer of the magnetic recording medium 10 to the electromagnetic coil element 34. The end part on the medium-opposing surface S side of the auxiliary magnetic pole layer 344 magnetically coupled to the main magnetic pole layer 340 forms a trailing shield part having a layer cross section wider than that of the other part of the auxiliary magnetic pole layer 344. The auxiliary magnetic pole layer 344 opposes the end part on the medium-opposing surface S side of the main magnetic pole layer 340 through the gap layer 341a and coil insulating layer 341b formed by an insulating material such as alumina. Providing such an auxiliary magnetic pole layer 344 makes the magnetic field gradient steeper between the auxiliary magnetic pole layer 344 and main magnetic pole layer 340 in the vicinity of the medium-opposing surface S. As a result, the jitter in signal output becomes smaller, whereby the error rate at the time of reading can be lowered.

Each of the main magnetic pole layer 340 and auxiliary magnetic pole layer 344 is constituted by an alloy of two or three of Ni, Fe, and Co, an alloy mainly composed of them and doped with a predetermined element, or the like having a thickness of about 0.5 to about 5 μm, for example, formed by using frame plating or sputtering, for example. Here, the main magnetic pole layer 340 and auxiliary magnetic pole layer 344 constitute a magnetic pole as a magnetic path.

The gap layer 341a, which separates the coil 342 and main magnetic pole layer 340 from each other, can have a thickness of about 0.01 to about 0.5 μm, for example, and is constituted by $Al_2O_3$, DLC, or the like formed by using sputtering or CVD, for example.

The coil 342 is formed from a thin film of Cu or the like having a thickness of about 0.5 to about 3 μm, for example, formed by using frame plating, for example. The rear end of the main magnetic pole layer 340 and the part of the auxiliary magnetic pole layer 344 remote from the medium-opposing surface S are joined to each other, while the coil 342 is formed so as to surround thus formed joint of the magnetic pole. The coil 342 is electrically connected to the recording pads 18a, 18b (see FIG. 3). When a voltage is applied between the recording pads 18a, 18b, a current flows through the coil 34 and pumps a magnetic field for writing.

Coil Insulating Layer

The coil insulating layer 341b, which separates the coil 342 and auxiliary magnetic pole layer 344 from each other, has a thickness of about 0.1 to about 5 μm, for example, and is electrically insulative. The coil insulating layer 341b is formed from a resin containing a carbon nanotube.

The carbon nanotube is a tubular structure formed by a graphite sheet and may be either a single tube or a coaxially multi-walled tube. The graphite sheet is mainly composed of 6-membered carbon rings but may contain 5- or 7-membered carbon rings as well.

The length of the carbon nanotube may be 50 to 1000 nm, for example. The diameter of the carbon nanotube may be 0.5 to 50 nm, for example. The carbon nanotube is available from GSI Creos Corporation under the product name of Carbere, for example.

Substituents may be bonded to carbons at terminals and side walls of the carbon nanotube. It will be preferred in particular from the viewpoint of improving the dispersibility in the resin if a saturated alkyl group $C_nH_{2n+1}$ is bonded to the carbon nanotube. Here, n is a natural number of 1 to 18. A preferred saturated alkyl group content is 20 wt % or less with respect to 100 parts by weight of the carbon nanotube.

The carbon nanotube content in the resin is preferably 0.05 to 5 wt %. When the content is less than 0.05 wt %, the effect of improving the thermal conductivity tends to decrease. When the content exceeds 5 wt %, the electric conductivity tends to become higher, thereby lowering the electrical insulating performance.

It will also be preferred if the coil insulating layer 341b contains a cyclodextrin. The dispersibility of the carbon nanotube in the resin also improves when it contains a cyclodextrin. Other dispersants such as sodium dodecyl sulfate may be contained as well.

The cyclodextrin is a cyclic oligosaccharide in which D-glucoses are combined like a ring by α-glucoside linkages. Though not restricted in particular, the number of glucoses is preferably 6 or greater, more preferably 8 or greater. Examples of the cyclodextrin include α-cyclodextrin, β-cyclodextrin, and γ-cyclodextrin. The cyclodextrin may be chemically modified by substituents and the like. A preferred cyclodextrin content is at least 1 molecule per molecule of the carbon nanotube.

Though not restricted in particular, a preferred resin ingredient other than the carbon nanotube and dispersants for the carbon nanotube in the resin constituting the coil insulating layer 341b is a so-called photoresist. It facilitates patterning into a desirable form. The photoresist typically contains a resin, a photosensitizer which directly or indirectly changes a property of the resin such as solubility or molecular weight, for example, in response to the light, radiation, or the like, and a required amount of a solvent. The species of the photoresist is not restricted in particular, whereby it may be of either positive or negative type. However, positive photoresists, so-called chemically amplified photoresists containing a photoacid generator as a photosensitizer in particular, are preferred. It may also be a photoresist further containing an acid generator generating an acid by heating employed in the RELACS (Resolution Enhancement Lithography Assisted by Chemical Shrink) technique.

Specific examples of the resin include those changing from alikali-insoluble to alikali-soluble by removing a protecting group in the presence of an acid as a catalyst, such as polyhydroxystyrene resins and novolac resins having a protecting group. Examples of the protecting group include t-butoxycarbonyl, t-butoxy, tetrahydropyranyl, and ethoxyethyl groups. Examples of the photoacid generator include onium salts such as triphenylsulfonium salts, sulfonates, and diazosulfones. A specific example is AZ DX5105P (manufactured by AZ Electronic Materials). It may also be a typical crosslinked resist such as polyimide.

The coil insulating layer 341b can be formed as follows, for example. First, a photoresist containing a carbon nanotube is prepared. Specifically, a known photoresist, a carbon nanotube, and a required amount of a dispersant for the carbon nanotube such as cyclodextrin may be mixed by using an ultrasonic stirrer or the like, for example. Here, it will be preferred if the carbon nanotube, an organic solvent such as ethanol, and the dispersant such as cyclodextrin are mixed beforehand and then are ultrasonically dispersed, the mixed liquid is filtered thereafter, and the filtrate and the photoresist are mixed. A preferred compounding amount of the carbon nanotube is on the order of 1 to 5 mg per 10 ml of the organic solvent, for example. The photoresist containing the carbon nanotube is applied onto the gap layer 341a by spin coating or the like. After the solvent is removed, the photoresist is exposed to light through a predetermined mask or the like. Thereafter, the photoresist is heated if necessary and developed so as to remove unnecessary parts thereof. For example, the joint between the main magnetic pole 340 and auxiliary magnetic pole 344 can be removed by the development.

The insulating layer 38 as an overcoat layer is formed so as to cover the electromagnetic coil element 34 on the side of the electromagnetic coil element 34 opposite from the slider substrate 210.

In the thin-film magnetic head or the like in accordance with this embodiment, the resin of the coil insulating layer 341b contains the carbon nanotube and thus can attain a thermal conductivity much higher than that conventionally available. Therefore, the heat generated from the coil 342 can efficiently be conducted to its surroundings, whereby the thin-film magnetic head 40 excellent in heat dissipation is realized.

The coil insulating layer 341b contains the carbon nanotube and thus can act to shield the magnetic field directly generated by the coil itself.

This can suppress the occurrence of thermal stresses, deterioration in performances of the magnetism detecting element, projection of the medium-opposing surface, and the like caused by the heating of the coil 342 during writing actions, thereby improving the reliability and achieving higher-density recording.

Without being restricted to the above-mentioned embodiment, the present invention can be modified in various ways.

The thin-film magnetic head 40 of the slider 21 may have the electromagnetic coil element 34 alone instead of both of the magnetoresistive element 33 and electromagnetic coil element 34.

What is claimed is:

1. A thin-film magnetic head comprising a magnetic pole, a coil surrounding the magnetic pole, and an insulating layer covering the coil;
    wherein the insulating layer is formed from a resin containing a carbon nanotube.

2. A thin-film magnetic head according to claim 1, wherein the resin contains 0.05 to 5 wt % of the carbon nanotube.

3. A thin-film magnetic head according to claim 1, wherein the resin further contains a cyclodextrin.

4. A thin-film magnetic head according to claim 2, wherein the resin further contains a cyclodextrin.

5. A thin-film magnetic head according to claim 1, wherein the resin is a chemically amplified photoresist.

6. A head gimbal assembly comprising a substrate, the thin-film magnetic head of claim 1 formed on the substrate, and a gimbal securing the substrate.

7. A hard disk drive comprising the head gimbal assembly of claim 6 and a recording medium opposing the thin-film magnetic head.

8. A thin-film magnetic head according to claim 1, wherein a saturated alkyl group $C_nH_{2n+1}$ is bonded to the carbon nanotube, and n is a natural number of 1 to 18.

9. A thin-film magnetic head according to claim 1, wherein the resin further contains sodium dodecyl sulfate.

10. A thin-film magnetic head according to claim 3, wherein the number of glucoses in the cyclodextrin is 6 or greater.

11. A thin-film magnetic head according to claim 1, wherein the carbon nanotube is mixed into the resin.

\* \* \* \* \*